United States Patent Office 3,475,437
Patented Oct. 28, 1969

---

3,475,437
3-TERTIARY AMINO LOWER ALKYL-PSEUDOINDOLES
Claus Adolf Landgraf and Ernst Seeger, Biberach an der Riss, Germany, assignors to Boehringer Ingelheim G.m.b.H., Ingelheim am Rhein, Germany, a corporation of Germany
No Drawing. Continuation-in-part of application Ser. No. 502,548, Oct. 22, 1965, which is a continuation-in-part of application Ser. No. 461,165, June 3, 1965. This application Oct. 5, 1966, Ser. No. 584,375
Claims priority, application Germany, June 5, 1964, T 26,315; Spain, Aug. 16, 1965, 316,532
Int. Cl. C07d 29/18, 87/32, 27/56
U.S. Cl. 260—293                         6 Claims

ABSTRACT OF THE DISCLOSURE

The compounds are 3-(amino-lower alkyl)-pseudoindoles and acid addition salts thereof, useful as analgesics, antiphlogistics and antitussives in warm-blooded animals.

---

This is a continuation-in-part of copending application Ser. No. 502,548, filed Oct. 22, 1965, now abandoned, which in turn is a continuation-in-part of application Ser. No. 461,165, filed June 3, 1965, now abandoned.

This invention relates to novel basic-substituted pseudoindoles and acid addition salts thereof, as well as to a process of preparing these compounds.

More particularly, the present invention relates to basic-substituted pseudoindoles of the formula

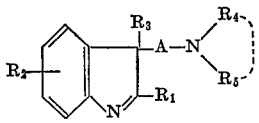

(I)

wherein
- $R_1$ is methyl or phenyl,
- $R_2$ is hydrogen, halogen, lower alkyl or lower alkoxy,
- $R_3$ is lower alkyl, phenyl, halophenyl, lower alkylphenyl or lower alkoxy-phenyl,
- $R_4$ is lower alkyl or lower alkenyl,
- $R_5$ is lower alkyl, lower alkenyl, cyclopropyl-alkyl or aralkyl, or
- $R_4$ and $R_5$, together with each other and the nitrogen atom to which they are attached, form a heterocyclic ring which may be interrupted by a further heteroatom and may have a lower alkyl, phenyl, halophenyl, hydroxy-phenyl, lower alkyl-phenyl or lower alkoxy-phenyl substituent attached to a ring atom, and
- A is a straight or branched bivalent acyclic hydrocarbon of 2 to 4 carbon atoms, and their non-toxic, pharmacologically acceptable acid addition salts.

The basic-substituted pseudoindoles according to the present invention may be prepared by subjecting a phenylhydrazone of the formula

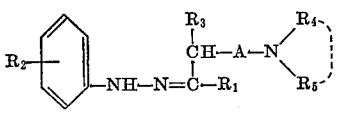

(II)

wherein $R_1$ through $R_5$ and A have the same meanings as in Formula I, to a cyclization reaction in the presence of a condensation agent which causes ammonia to be split off.

The cyclization reaction is carried out at a temperature between 50 and 180° C., preferably between 80 and 160° C., and in the presence of an inert organic solvent, if desired. Examples of suitable condensation agents which effect the cleavage of ammonia from the phenyl-hydrazone compound II are borontrifluoride or acid catalysts, such as sulfuric acid, hydrohalic acids and polyphosphoric acid, or zinc chloride or heavy metal chlorides, such as cuprous chloride, nickel chloride or ferrous chloride. Examples of suitable inert solvents are preferably polar solvents, especially alkanols such as methanol, ethanol and butanol, glycols, or lower fatty acids such as acetic acid. If a non-polar solvent, such as chloroform or benzene, is used, the yields of such product are somewhat lower than if a polar solvent is used.

The phenylhydrazones of the Formula II, which are used as starting materials in the process for the preparation of the pseudoindoles according to the present invention, may themselves be prepared by well known methods; for example, pursuant to the method described by Houben-Weyl, Methoden der Organischen Chemie, vol. VII, part I, pages 461 et seq. (1954), by reacting an aminoketone of the formula

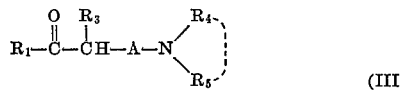

(III)

wherein $R_1$, $R_3$, $R_4$, $R_5$ and A have the same meanings as in Formula I, with a phenylhydrazine.

For instance, 1-dimethylamino-3-phenyl-pentanone-(4)-phenylhydrazone

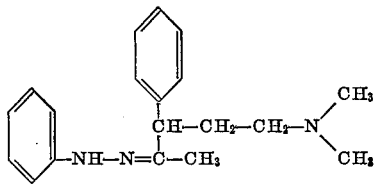

was obtained in the following manner:

120.0 gm. of 1-dimethylamino-3-phenyl-pentanone-(4)- were dissolved in 200 cc. of toluene, the resulting solution was admixed with 64.0 gm. of phenylhydrazine, 1 cc. of a saturated solution of hydrogen chloride in ether was added, and the mixture was refluxed for two to three hours; during that time the calculated amount of water separated out in a water separator connected to the reflux apparatus. Thereafter, the toluene was distilled off and the residue was fractionated in vacuo. The fraction which passed over between 177 and 179° C. at 0.07 mm. Hg was collected; it solidified and then had a melting point of 60° C. The yield was 89% of theory.

The following additional, previously not specifically described phenylhydrazones of the Formula II were prepared in analogous fashion:

(a) 1-dimethylamino-3-(p-methoxy-phenyl)-pentanone-(4)-phenylhydrazone, M.P. 115° C.
(b) 1-dimethylamino-3-phenyl-pentanone-(4)-p-tolyl hydrazone, M.P. 64–65° C.
(c) 1-dimethylamino-3-phenyl-pentanone-(4)-p-chlorophenylhydrazone, M.P. 68° C.
(d) 2-dimethylamino-4-phenyl-hexanone-(5)-phenylhydrazone, B.P. 168–172° C. at 0.05 mm. Hg.

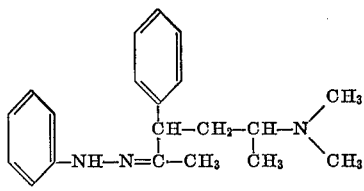

(e) 1-(4-phenyl-piperidino)-3-phenyl-pentanone-(4)-phenylhydrazone, M.P. 121° C. (from ethanol).

(f) 1-(4-phenyl-1,2,5,6-tetrahydropyridino)-3-phenyl-pentanone-(4)-phenylhydrazone, M.P. 119–121° C. (from ethanol).

The remaining phenylhydrazones of the Formula II used as starting material in Examples 1 through 9 below have previously been specifically described elsewhere and were not purified prior to their use for the preparation of the pseudoindoles.

The aminoketones of the formula

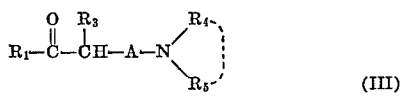

wherein $R_1$, $R_3$, $R_4$, $R_5$ and A have the same meanings as in Formula I, which are required as starting compounds for the preparation of the phenylhydrazones of the Formula II above, are either known from the literature or may be prepared by known methods, such as by the process described by W. Wilson in J. Chem. Soc. 1952, pages 6 to 9. Using that method, the following aminoketones of the Formula III above were prepared:

(a) 1-piperidino-3-phenyl-pentanone-(4), B.P. 127–129° C. at 0.15 mm. Hg.
(b) 1-dimethylamino-4-phenyl-hexanone-(5), B.P. 102–108° C. at 0.15 mm. Hg.
(c) 1-pyrrolidino-3-phenyl-pentanone-(4), B.P. 108–111° C. at 0.3 mm. Hg.
(d) 1-morpholino-3-phenyl-pentanone-(4), B.P. 128–131° C. at 0.1 mm. Hg.
(e) 1-dimethylamino-3-(p-tolyl)-pentanone-(4), B.P. 113–114° C. at 0.3 mm. Hg.
(f) 1-dimethylamino-3-(m-methoxy-phenyl)-pentanone-(4), B.P. 114–115° C. at 0.11 mm. Hg.
(g) 1-dimethylamino-3-(p-chlorophenyl)-pentanone-(4), B.P. 110–113° C. at 0.14 mm. Hg.
(h) 1(β-penylethyl-methylamino)-3-phenyl-pentanone-(4), B.P. 168–170° C. at 0.2 mm. Hg.
(i) 1-diethylamino-3-phenyl-pentanone-(4), B.P. 96–98° C. at 0.08 mm. Hg.
(j) 1-dimethylanino-3-(p-methoxyphenyl)-pentanone-(4), B.P. 122–124° C. at 0.13 mm. Hg.
(k) 1-dimethylamino-3-(m,p-dimethoxyphenyl)-pentanone-(4), B.P. 136–140° C. at 0.2 mm. Hg.
(l) 1-diethylamino-3,4-diphenyl-butanone-(4), M.P. 87° C.
(m) 1-dimethylamino-3,4-diphenyl-butanone-(4), B.P. 142–143° C.
(n) 1-(ollyl-methylamino)-3-phenyl-pentanone-(4), B.P. 89–91° C. at 0.2 mm. Hg.
(o) 1(γ,γ-dimethylallyl-methylamino)-3-phenyl-pentanone-(4), B.P. 172–173° C. at 11 mm. Hg.
(p) 1-(cyclopropylmethyl-methylamino)-3-phenyl-pentanone-(4), B.P. 170–171° C. at 11 mm. Hg.
(q) 1-(4-phenyl-piperidino)-3-phenyl-pentanone-(4), B.P. 170–178° C. at 0.02 mm. Mg.
(r) 1-(4-phenyl-1,2,5,6-tetrahydropyridino)-3-phenyl-pentanone-(4), B.P. 160–175° C. at 0.04 mm. Hg.
(s) 1-(4′-p-tolyl-piperidino)-3-phenyl-pentanone-(4), B.P. 182° C. at 0.02 mm. Hg.
(t) 1-diallylomino-3-phenyl-pentanone-(4), B.P. 96–100° C. at 0.02 mm. Hg.
(u) 1-(4′-p-methoxyphenyl-piperidino)-3-phenyl-pentanone-(4), B.P. 205–210° C. at 0.02 mm. Hg.
(v) 1-(N′-phenylpiperazino)-3-phenyl-pentanone-(4),B.P. 190–210° C. at 0.2 mm. Hg.
(w) 1-methyl-ethyl-amino)-3-phenyl-pentanone-(4), B.P. 143° C. at 12 mm. Hg.

The basic-substituted pseudoindoles of the Formula I above may, if desired, be converted into acid addition salts, especially non-toxic, pharmacologically acceptable acid addition salts by conventional methods; for instance, by dissolving the free base compound in a suitable solvent and acidifying the solution with the desired inorganic or organic acid.

Examples of inorganic and organic acids which will form non-toxic, pharmacologically acceptable acid addition salts with the basic-substituted pseudoindoles according to the present invention are hydrochloric acid, hydrobromic acid, sulfuric acid, phosphoric acid, acetic acid, benzoic acid, salicylic acid, methanesulfonic acid, mandelic acid, malonic acid, maleic acid, citric acid, tartaric acid, 8-chlorotheophylline and the like.

The following examples further illustrate the present invention and will enable others skilled in the art to understand it more completely. It should be understood, however, that our invention is not limited solely to the particular examples given below.

EXAMPLE 1

Preparation of 2-methyl-3-phenyl-3-(β-piperidinoethyl)-pseudoindole 89.0 gm. of raw 1-piperidino-3-phenyl-pentanone-(4)-phenylhydrazone were dissolved in 120.0 gm. of glacial acetic acid and, while cooling, the solution was admixed with 115.0 gm. of borontrifluoride etherate which had been diluted with an equal amount og glacial acetic acid. The resulting reaction mixture was then heated for two hours at 90° C. on a water bath. Thereafter, the volatile components were distilled off in a water aspirator pump vacuum, the residue was made alkaline with an aqueous 20% potassium carbonate solution, the organic phase was taken up in ether, and the ethereal solution was separated and dried with potassium carbonate. Thereafter, the ether was distilled off, and the residue was fractionally distilled in vacuo, yielding 25.0 gm. of 2-methyl-3-phenyl-3-(β-piperidinoethyl)-pseudoindole, B.P. 170–173° C. at 0.04 mm. Hg, of the formula

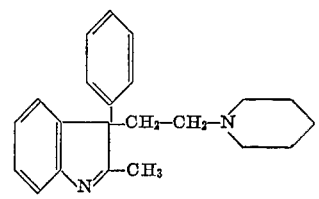

For preparation of the hydrochloride addition salt, the purified free base was dissolved in anhydrous ether and the solution was carefully acidified with anhydrous ethereal hydrochloric acid. The precipitate formed thereby was collected and purified by boiling it with acetone and thereafter recrystallizing it from a mixture of methanol and ether. The hydrochloride thus obtained had a melting point of 243–244° C.

By using an analogous procedure the following additional basic-substituted pseudoindoles were prepared:

(a) 2-methyl-3-phenyl - 3 - (β - pyrrolidino - ethyl)-pseudoindole, B.P. 182–187° C. at 0.22 mm. Hg, of the formula

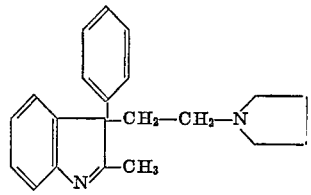

from 1-pyrrolidino-3-phenyl - pentanone - (4) - phenylhydrazone. The hydrochloride had a melting point of 240–244° C.

(b) 2-methyl - 3 - phenyl - 3 - (β - morpholinoethyl)- pseudoindole, B.P. 200° C. at 0.2 mm. Hg, of the formula

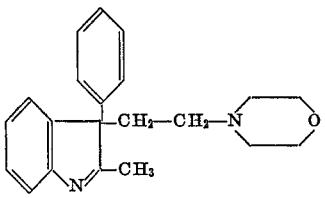

from 1 - morpholino - 3 - phenyl - pentanone - (4)-phenylhydrazone. The hydrochloride had a melting point of 228° C.

EXAMPLE 2

Preparation of 2-methyl-3-phenyl-3-(β-dimethyl-amino-ethyl)-pseudoindole 60.0 gm. of 1-dimethylamino-3-phenyl-pentanone-(4)-phenylhydrazone were admixed with 30 cc. of absolute ethanol, and the mixture was heated at 90–100° C. on a water bath. The melt formed thereby was admixed with 60.0 gm. of anhydrous zinc chloride, whereupon the temperature rose to 100° C. Thereafter, the mixture was heated for five hours at 150° C. on an oil bath and was then allowed to cool. The cool reaction mixture was first admixed with 100 cc. of benzene and then, while cooling exteriorly with ice, concentrated ammonia was added until the mixture was alkaline. The benzene phase was diluted with 100 cc. of ether and separated from the aqueous phase, and was thereafter washed several times with water and dried with potassium carbonate. The solvent was evaporated, and the residue was distilled in vacuo. 32.0 gm. of 2-methyl-3-phenyl-3-(β-dimethylamino-ethyl)-pseudoindole, B.P. 148–152° C. at 0.11 mm. Hg, of the formula

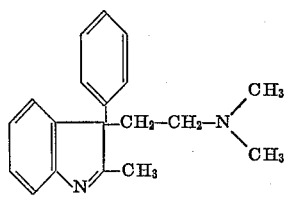

were obtained.

Its acetate had a melting point of 91° C.
Its hydrochloride had a melting point of 244–245° C.
Its hydrobromide had a melting point of 231° C.

EXAMPLE 3

Preparation of 2-methyl-3-phenyl-3-(β-dimethylamino-ethyl)-pseudoindole 100.0 gm. of 1-dimethylamino-3-phenyl-pentanone-(4)-phenylhydrazone were dissolved in an equal amount of glacial acetic acid, and then a mixture of 200.0 gm. of concentrated sulfuric acid and 470.0 gm. of glacial acetic acid was added to the solution. The reaction mixture was heated for five hours at 100° C. Thereafter, the reaction mixture was concentrated to one-half its volume in a water aspirator pump vacuum and then, while cooling, potassium carbonate was added until the mixture was alkaline. The liquid product liberated thereby was extracted with ether, the ether was evaporated from the separated extract solution, and the residue was fractionated in vacuo. 25.0 gm. of 2-methyl-3-phenyl-3-(β-dimethylamino-ethyl)-pseudoindole, B.P. 148–152° C. at 0.1 mm. Hg, were obtained.

(a) Using a procedure analogous to that described above, 2-methyl - 3 - phenyl - 3 - (β - diethylamino-ethyl)-pseudoindole, B.P. 152–153° C. at 0.11 mm. Hg, was prepared from 1-diethylamino-3-phenyl-pentanone - (4)-phenylhydrazone. Its hydrochloride had a melting point of 208° C.

EXAMPLE 4

Preparation of 2-methyl-3-phenyl-3-(β-dimethylamino-ethyl)-pseudoindole 50 gm. of 1-dimethylamino-3-phenyl-pentanone - (4)-phenylhydrazone were added in small portions at 70° C. to 100 gm. of polyphosphoric acid, accompanied by stirring, whereby the temperature rose slightly. Thereafter, the reaction mixture was stirred for two hours at 140° C., allowed to cool, decomposed with water, and then heated at 100° C. until all of the reaction product had gone into solution. The acid solution obtained thereby was made alkaline with sodium hydroxide while cooling, and the liquid product formed thereby was extracted with ether. The extract solution was then worked up as described in Example 2. The product was identified to be 2-methyl - 3 - phenyl - 3 - (β - dimethylamino - ethyl)-pseudoindole.

EXAMPLE 5

Preparation of 2-methyl-3-(β-dimethylamino-ethyl)-3-(p-methoxyphenyl)-pseudoindole A mixture of 71.0 gm. of 1-dimethylamino - 3 - (p-methoxy - phenyl) - pentanone - (4) - phenylhydrazone, 60 cc. of ethanol and 100.0 gm. of anhydrous zinc chloride was heated for five hours at 150–160° C. on an oil bath. Thereafter, the reaction mixture was worked up as described in Example 2, yielding 25.0 gm. of 2-methyl-3-(β - dimethylamino - ethyl) - 3 - (p - methoxyphenyl)-pseudoindole, B.P. 185–193° C. at 0.25 mm. Hg, of the formula

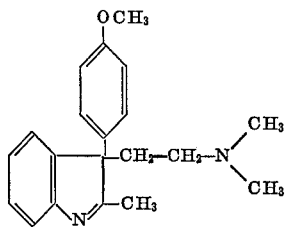

Its colorless hydrochloride had a melting point of 228–229° C. after recrystallization from a mixture of methanol and ether.

Using an analogous procedure, the following additional basic-substituted pseudoindoles were prepared:

(a) 2-methyl-3-(3',4'-dimethoxyphenyl)-3-(β-dimethyl-amino-ethyl)-pseudoindole, B.P. 180–190° C. at 0.09 mm. Hg, of the formula

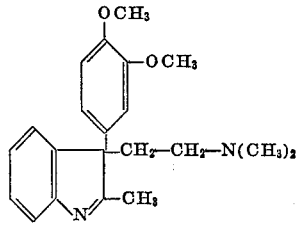

from 1 - dimethylamino - 3 - (3',4' - dimethoxyphenyl) - pentanone-(4)-phenylhydrazone. Its hydrochloride had a melting point of 217–219° C.

(b) 2 - methyl - 3 - (p - tolyl) - 3 - (β - dimethylamino-ethyl)-pseudoindole, B.P. 182–185° C. at 0.45 mm. Hg, of the formula

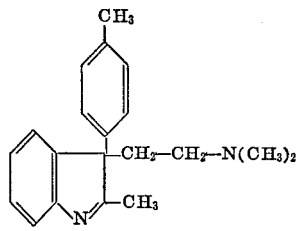

from 1 - dimethylamino - 3 - (p - tolyl) - pentanone - (4) - phenylhydrazone. Its hydrochloride had a melting point of 236–237° C.

(c) 2 - methyl - 3 - (m - methoxyphenyl) - 3 - (β - dimethylamino-ethyl)-pseudoindole, B.P. 158–160° C. at 0.07 mm. Hg, of the formula

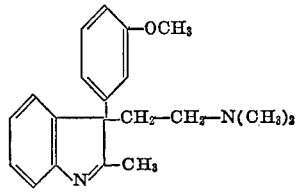

from 1 - dimethylamino - 3 - (m - methoxy) - pentanone - (4)-phenyl hydrazone. Its hydrochloride had a melting point of 207° C.

(d) 2 - methyl - 3 - (p - chlorophenyl) - 3 - (β - dimethylamino-ethyl)-pseudoindole, B.P. 156–157° C. at 0.09 mm. Hg, of the formula

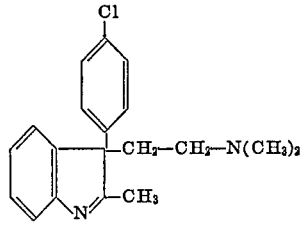

from 1 - dimethylamino - 3 - (p - chlorophenyl) - pentanone - (4) - phenylhydrazone. Its hydrochloride had a melting point of 244° C.

EXAMPLE 6

Preparation of 2,5-dimethyl-3-phenyl-3-(β-dimethylamino-ethyl)-pseudoindole

Using a procedure analogous to that described in Example 5, 24.0 gm. of 2,5-dimethyl-3-phenyl-3-(β-dimethylamino-ethyl)-pseudoindole, B.P. 158–161° C. at 0.2 mm. Hg, of the formula

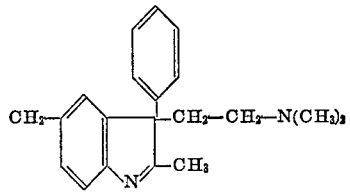

were prepared from 40.0 gm. of 1-dimethylamino-3-phenyl-pentanone - (4) - (p-tolylhydrazone). Its colorless hydrochloride had a melting point of 220–222° C. after recrystallization from a mixture of ethylacetate and methanol.

In analogous fashion the following additional basic-substituted pseudoindoles were prepared:

(a) 2 - methyl - 3 - phenyl - 3 - (β - dimethylamino - ethyl)-5-chloro-pseudoindole, B.P. 158–159° C. at 0.13 mm. Hg, of the formula

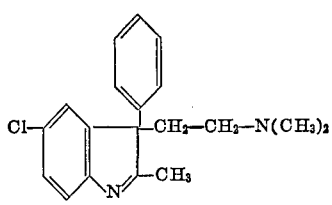

from 1 - dimethylamino - 3 - phenyl - pentanone - (4) - (p-chloro-phenylhydrazone). Its hydrochloride had a melting point of 226° C.

(b) 2 - methyl - 3 - phenyl - 3 - (β - dimethylamino - ethyl) - 5 - methoxy-pseudoindole, B.P. 165–175° C. at 0.1 mm. Hg, of the formula

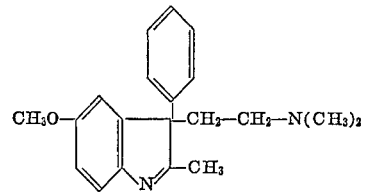

from 1 - dimethylamino - 3 - phenyl - pentanone - (4) - (p-methoxy-phenylhydrazone). Its hydrochloride had a melting point of 212–214°C.

(c) 2 - methyl - 3 - phenyl - 3 - (β - dimethylamino - ethyl)-7-methoxy-pseudoindole, B.P. 170–182° C. at 0.15 mm. Hg, of the formula

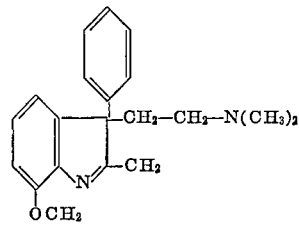

from 1 - dimethylamino - 3 - phenyl - pentanone - (4)-(o-methoxy-phenylhydrazone). Its hydrochloride had a melting point of 237–239° C.

(d) 2 - methyl - 3 - phenyl - 3 - (β - dimethylamino - ethyl) - 7 - chloro - pseudoindole, B.P. 180–185° C. at 0.1 mm. Hg, of the formula

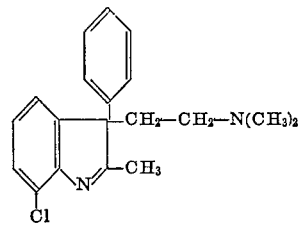

from 1 - dimethylamino - 3 - phenyl - pentanone - (4) - (o-chloro-phenylhydrazone). Its hydrochloride had a melting point of 229° C.

EXAMPLE 7

Preparation of 2-methyl-3-phenyl-3-(γ-dimethylamino-n-propyl)-pseudoindole

Using a procedure analogous to that described in Example 5, 41.0 gm. of 2-methyl-3-phenyl-3-(γ-dimethylamino-n-propyl)-pseudoindole, B.P. 165–169° C. at 0.06 mm. Hg, of the formula

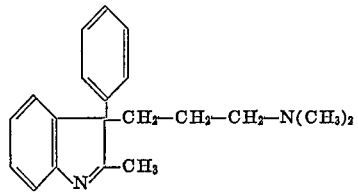

were prepared from 95.0 gm. of 1-dimethylamino-4-phenyl-hexanone-(5). Its hydrochloride had a melting point of 214–215° C. after recrystallization from a mixture of methanol and ether.

EXAMPLE 8

Preparation of 2-methyl-3-phenyl-3-(β-dimethylamino-α-methyl-ethyl)-pseudoindole and 2-methyl-3-phenyl-3-(β-dimethylamino-β-methyl-ethyl)-pseudoindole (a) Using a procedure analogous to that described in Example 2, 12.0 gm. of a mixture of 2-methyl-3-phenyl- 3-(β-dimethylamino - α - methyl-ethyl)-pseudoindole and 2-methyl-3-phenyl-3-(β - dimethylamino-β-methyl-ethyl)-pseudoindole of the respective formulas

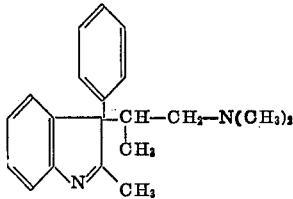

and

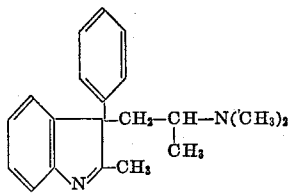

were obtained from 30 gm. of a mixture of 2-dimethyl-amino-4-phenyl-hexanone-(5)-phenylhydrazone and 1-dimethylamino-2-methyl - 3 - phenyl-pentanone-(4)-phenylhydrazone; the mixture had a boiling point of 148–155° C. at 0.07 mm. Hg.

For the purpose of separating the individual components of the mixture, the fractional distillate was taken up in petroleum ether, and the solution was cooled, 6 gm. of one of the above-identified isomers, M.P. 98–99° C., precipitated out. Its hydrochloride had a melting point of 234° C. after recrystallization from a mixture of ethylacetate and methanol.

(b) The residual petroleum ether mother liquor from step (a) was evaporated to remove the solvent, and the residue was fractionated in vacuo. The fraction passing over between 152 and 158° C. at 0.11 mm. Hg was collected and repeatedly recrystallized from cold petroleum ether, yielding the other isomer which had a melting point of 98–99° C.

The mother liquor of the last crystallization was evaporated and the residual oil was dissolved in ether. The ethereal solution was acidified with ethereal hydrochloric acid, whereby the hydrochloride of the second isomer precipitated out; it had a melting point of 190° C.

It has not been determined which of the above-identified isomers was obtained in steps (a) and (b) respectively.

EXAMPLE 9

Preparation of 2,3-diphenyl-3-(β-diethylamino-ethyl)-pseudoindole

Using a procedure analogous to that described in Example 2, 23.0 gm. of 2,3-diphenyl-3-(β-diethylamino-ethyl)-pseudoindole, B.P. 185–190° C. at 0.1 mm. Hg, M.P. 87° C. from petroleum ether, of the formula

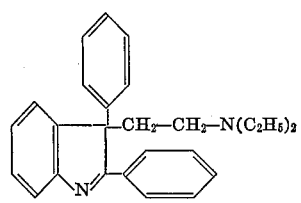

were prepared from 100.0 gm. of 1-diethylamino-3,4-diphenyl-butanone-(4)-phenylhydrazone. Its hydrochloride had a melting point of 178° C.

(a) In analogous fashion 2,3-diphenyl-3-(β-dimethyl-amino-ethyl)-pseudoindole, M.P. 175–180° C. at 0.06 mm. Hg, was prepared from 1-dimethylamino-3,4-diphenyl-butanone-(4). Its hydrochloride had a melting point of 206–208° C.

EXAMPLE 10

Preparation of 2-methyl-3-phenyl-3-[β-(β-phenylethyl-methylamino)-ethyl]-pseudoindole Using a procedure analogous to that described in Example 1, 2-methyl-3-phenyl-3-[β-(β-phenylethyl-methylamino)-ethyl]-pseudoindole, B.P. 200–210° C. at 0.15 mm. Hg, of the formula

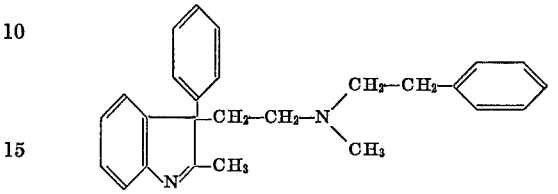

was prepared from 1-(β-phenylethyl-methylamino)-3-phenyl-pentanone-(4). Its oxalate had a melting point of 170° C.

EXAMPLE 11

Preparation of 2,3-dimethyl-3-(β-dimethylamino-ethyl)-pseudoindole 22.0 gm. of 1-dimethylamino-3-methyl-pentanone-(4) were admixed with 25 cc. of ethanol and 40.0 gm. of anhydrous zinc chloride, and the mixture was refluxed for five hours and then worked up as described in Example 2. 14.0 gm. of 2,3-dimethyl-3-(β-dimethylamino-ethyl)-pseudoindole, B.P. 79–80° C. at 0.07 mm. Hg, of the formula

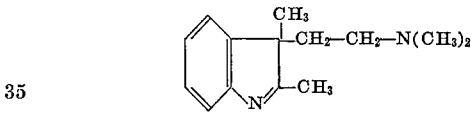

were obtained. Its hydrochloride had a melting point of 209° C. after recrystallization from a mixture of methanol and ether.

EXAMPLE 12

Preparation of 2-methyl-3-phenyl-3-[β-(methyl-allylamino)-ethyl]-pseudoindole

A mixture of 55.0 gm. of 1-(methyl-allylamino)-3-phenyl-pentanone-(4)-phenylhydrazone, 25 cc. of ethanol and 55.0 gm. of anhydrous zinc chloride was refluxed for five hours. Thereafter, the reaction mixture was worked up as described in Example 2. 20.0 gm. of 2-methyl-3-phenyl - 3 - [β-(methyl-allylamino)-ethyl]-pseudoindole, B.P. 142–143° C. at 0.08 mm. Hg, of the formula

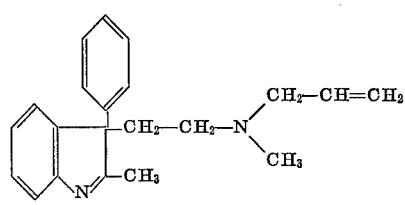

were obtained. After recrystallization from a mixture of ethylacetate and methanol its hydrochloride had a melting point of 210° C.

EXAMPLE 13

Using a procedure analogous to that described in Example 12, 2-methyl - 3 - phenyl-3-[β-(γ,γ-dimethylallyl-methylamino)-ethyl]-pseudoindole of the formula

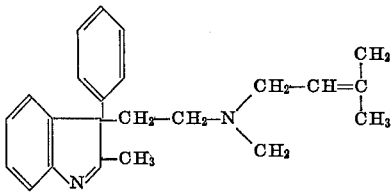

(B.P. 151–152° C. at 0.2 mm. Hg) was prepared from 1-(γ,γ-dimethylallyl-methylamino)-3-phenyl-pentanone-(4) phenylhydrazone. Its hydrogen maleate had a melting point of 141° C. (from ethylacetate).

EXAMPLE 14

Using a procedure analogous to that described in Example 12, 2 - methyl-3-phenyl-3-[β-(cyclopropylmethyl-methylamino)-ethyl]-pseudoindole of the formula

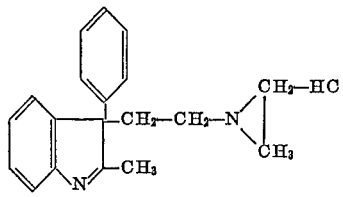

(B.P. 147–148° C. at 0.04 mm. Hg) was prepared from 1-(cyclopropylmethyl-methylamino)-3-phenyl-pentanone-(4)-phenylhydrazone. Its hydrochloride had a melting point of 235–236° C. (from ethylacetate/methanol).

EXAMPLE 15

Preparation of 2-methyl-3-phenyl-3-[β-(4'-phenyl-piperidino)-ethyl]-pseudoindole A mixture of 100 cc. of ethanol and 180 gm. of anhydrous zinc chloride was admixed with 100 gm. of 1-(4'-phenyl-piperidino) - 3-phenyl-pentanone-(4)-phenylhydrazone, and the resulting mixture was heated for six hours at an internal temperature of 110–115° C. Thereafter, the reaction mixture was allowed to cool, and then concentrated aqueous ammonia was added until the mixture was alkaline, whereby the temperature of the mixture rose and an oily substance separated out. The mixture was extracted with benzene, and the benzene phase was separated, dried with potassium carbonate and distilled to remove the benzene solvent. The residue was distilled in vacuo, yielding 60 gm. of 2-methyl-3-phenyl-3-[β-(4'-phenyl-piperidino)-ethyl]-pseudoindole, B.P. 210–220° C. at 0.05 mm. Hg, of the formula

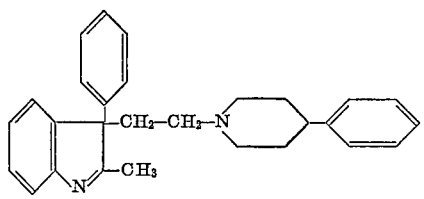

The following acid addition salts were prepared by acidifying a solution of the free base with the corresponding acid:
Hydrochloride, M.P. 188–190° C. (from methanol).
Methanesulfonate, M.P. 235–236° C. (from ethylacetate/methanol.
Mandelate, M.P. 194° C.
Hydrogen malonate, M.P. 141° C.
Hydrogen maleate, M.P. 169–170° C.

EXAMPLE 16

Preparation of 2-methyl-3-phenyl-3-[β-(4'-phenyl-1',2',5',6'-tetrahydropyridino)-ethyl]-pseudoindole Using a procedure analogous to that described in Example 15, 25.0 gm. of 1-(4'-phenyl-1',2',5',6'-tetrahydropyridino)-3-phenyl-pentanone-(4)-phenylhydrazone were reacted with 45.0 gm. of anhydrous zinc chloride and 25 cc. of ethanol, and the reaction mixture was worked up. 12 gm. of 2-methyl-3-phenyl-3-[β-(4'-phenyl-1',2',5',6'-tetrahydropyridino) - ethyl]-pseudoindole, B.P. 220–224° C. at 0.04 mm. Hg, of the formula

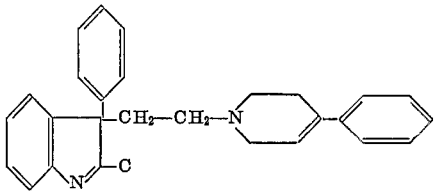

were obtained. Its hydrochloride had a melting point of 216–217° C. after recrystallization from ethylacetate/methanol.

EXAMPLE 17

Preparation of 2-methyl-3-phenyl-3-[β-(4'-p-tolyl-piperidino-1')-ethyl]-pseudoindole Using a procedure analogous to that described in Example 15, 2-methyl-3-phenyl-3-[β-(4'-p-tolyl - piperidino-1')-ethyl]-pseudoindole, B.P. 230–232° C. at 0.02 mm. Hg, of the formula

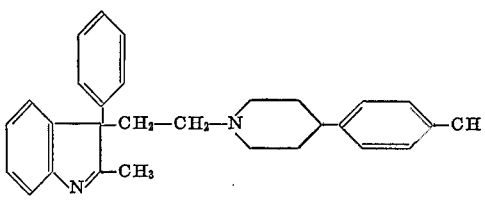

was obtained from 1-(4'-p-tolyl-piperdino-1')-3-phenyl-pentanone-(4)-phenylhydrazone (M.P. 120° C.), anhydrous zinc chloride and ethanol.

The following acid addition salts were obtained by acidifying a solution of the free base with the corresponding acid:
Hydrochloride, M.P. 218° C. (from ethylacetate/methanol).
Hydrogen maleate, M.P. 181–182° C. (from ethylacetate/methanol).
Methanesulfonate, M.P. 214° C. (from ethylacetate/methanol).
Oxalate, M.P. 229–231° C. (from methanol).
β-Naphthalenesulfonate, M.P. 152° C. (from ethanol/water).

EXAMPLE 18

Preparation of 2-methyl-3-phenyl-3-(β-diallylamino-ethyl)-pseudoindole

Using a procedure analogous to that described in Example 12, 2-methyl-3-phenyl-3-(β - diallylamino-ethyl)-pseudoindole, B.P. 150–154° C. at 0.05 mm. Hg, of the formula

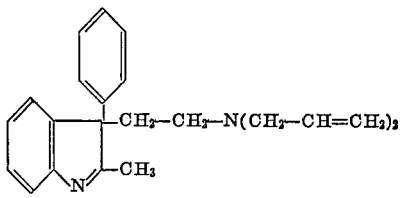

was obtained from raw 1 - diallylamino - 3 - phenyl-pentanone-(4) - phenylhydrazone (B.P. 100° C. at 0.02 mm. Hg), anhydrous zinc chloride and ethanol.

Its hydrochloride had a melting point of 165–166° C. and its methane sulfonate melted at 118° C.

EXAMPLE 19

Preparation of 2-methyl-3-phenyl-3-[β-(4'-p-methoxy-phenyl-piperidino)-ethyl]-pseudoindole Using a procedure analogous to that described in Example 15, 2-methyl-3-phenyl-3-[β(4'-p-methoxyphenyl-piperidino)-ethyl]-pseudoindole of the formula

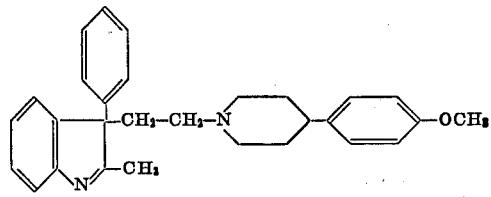

was prepared from 1-(4'-p-methoxyphenyl-piperidino)-3-phenyl-pentanone - (4) - phenylhydrazone (M.P. 84–85° C.), anhydrous zinc chloride and ethanol.

Its methanesulfonate had a melting point of 213° C. after recrystallization from methanol.

EXAMPLE 20

Preparation of 2-methyl-3-phenyl-3-[β-(methyl-ethyl-amino)-ethyl]-pseudoindole

A mixture of 65.5 gm. of 1-(methyl-ethyl-amino)-3-phenyl-pentanone-(4), 32 gm. of phenylhydrazine, 100 cc. of anhydrous toluene and a knife-tip-full of toluenesulfonic acid was refluxed in a reflux vessel provided with a water separator. After the calculated amount of water had separated, the reaction solution was evaporated to dryness, and the residue was recrystallized from ethanol, yielding 1-(methyl-ethyl-amino)-3-phenyl-pentanone-(4)-phenylhydrazone, M.P. 67° C.

80 gm. of the hydrazone thus obtained were admixed with 80 cc. of absolute ethanol and 160 gm. of anhydrous zinc chloride, and the mixture was heated for 6 hours on an oil bath at 110–115° C. bath temperature. Thereafter, the reaction solution was carefully decomposed with concentrated ammonia, ether was added, and the two liquid phases formed thereby were separated from each other. The ether phase was dried with anhydrous potassium carbonate and then evaporated, and the residue was distilled in vacuo. 30 gm. of 2-methyl-3-phenyl - 3 - [β-(methyl-ethyl-amino)-ethyl]-pseudoindole, B.P. 142–145° C. at 0.2 mm. Hg, of the formula

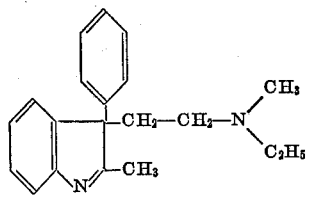

were obtained.

Its hydrochloride had a melting a point of 225° C. after recrystallization from methanol/ethylaceate.

EXAMPLE 21

Preparation of 2-methyl-3-phenyl-3-[β-(N'-phenyl-piperazino)-ethyl]-pseudoindole A mixture of 45 gm. of 1-(N'-phenyl-piperazino)-3-phenyl-pentanone-(4), 14.5 gm. of phenylhydrazine, 100 cc. of anhydrous toluene and a knife-tip-full of toluenesulfonic acid was refluxed as in the preceding example. After the calculated amount of water had collected in the water separator the toluene was evaporated, leaving raw 1-(N'-phenyl-piperazino)-3-phenyl-pentanone-(4)-phenylhydrazone.

60 gm. of the raw hydrazone thus obtained were admixed with 60 cc. of absolute ethanol and 120 gm. of anhydrous zinc chloride, and the mixture was heated for 5 to 6 hours at 115° C. (internal temperature) on an oil bath. Thereafter, the reaction solution was allowed to cool to about 60° C., carefully decomposed with concentrated ammonia, water and ether were added, and the two liquid phases formed thereby were separated from each other. The ether phase was dried with anhydrous potassium carbonate and then evaporated, and the residue was distilled in vacuo. 2-methyl-3-phenyl-3-[β-(N'-phenyl-piperazino)-ethyl]-pseudoindole, B.P. 225–230° C. at 0.05 mm. Hg, of the formula

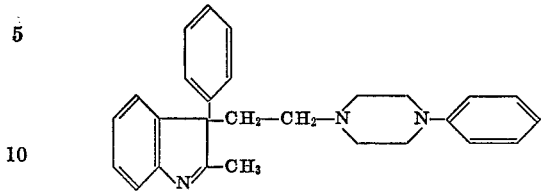

was obtained.

Its hydrochloride had a melting point of 242° C. after recrystallization from ethylacetate/methanol.

The compounds according to the present invention, that is, those embraced by Formula I above and their non-toxic, pharmacologically acceptable acid addition salts, have useful pharmacodynamic properties. More particularly, they exhibit analgesic, antitussive and antiphlogistic properties in warm-blooded animals.

For pharmaceutical purposes the compounds are administered to warm-blooded animals by the oral or parenteral route as active ingredients in customary dosage unit compositions, that is, compositions in dosage unit form consisting essentially of an inert pharmaceutical carrier and one dosage unit of the active ingredient, such as tablets, coated pills, solutions, suspensions, syrups, suppositories and the like. One dosage unit of the compounds according to the present invention is from 1 to 250 mgm., preferably 1 to 50 mgm.

The following examples illustrate a few dosage unit compositions comprising a compound according to the present invention as the active ingredient. The parts are parts by weight unless otherwise specified:

EXAMPLE 22

Suppositories

The suppository composition is compounded from the following ingredients:

| | Parts |
|---|---|
| 3-(β-dimethylamino-ethyl)-2-methyl-3-phenyl-pseudoindole hydrochloride | 25.0 |
| Cocoa butter | 1675.0 |
| Total | 1700.0 |

Compounding procedure:

The cocoa butter is melted at 45° C., and the finely pulverized pseudoindole compound is stirred in. The mixture is homogenized and is then poured at 35° C. into cooled suppository molds each holding 1700 mgm. of the suppository composition. Each suppository cntains 25 mgm. of the active ingredient.

EXAMPLE 23

Drop solution

The solution is compounded from the following ingredients:

| | Parts |
|---|---|
| 2-methyl-3-phenyl-3-(β-dimethylamino-ethyl)-pseudoindole hydrochloride | 5.0 |
| 1,2-propyleneglycol | 15.0 |
| Saccharin sodium | 0.01 |
| p-Hydroxybenzoic acid methyl ester | 0.035 |
| p-Hydroxybenzoic acid propyl ester | 0.015 |
| Distilled water q.s. ad by vol. | 100.0 |

*Compounding procedure.*—The p-hydroxybenzoic acid esters are dissolved in about half of the required amount of water at 80° C. The solution is cooled to room temperature, and then the pseudoindole compound, the saccharin sodium and the propyleneglycol are added. The resulting solution is diluted to 100 parts by volume and filtered. 1 cc. of solution (about five drops) contains 50 mgm. of the active ingredient.

EXAMPLE 24
Tablets

The tablet composition is compounded from the following ingredients:

|  | Parts |
|---|---|
| 3-(β-dimethylamino-ethyl)-2-methyl-3-phenyl-pseudoindole hydrochloride _____parts__ | 25.0 |
| Lactose, pulverized _____ | 100.0 |
| Potato starch, dry _____ | 84.0 |
| Polyvinylpyrrolidone _____ | 6.0 |
| Sodium celluloseglycolate _____ | 4.0 |
| Magnesium stearate _____ | 1.0 |
| Total _____ | 220.0 |

*Compounding procedure.* — The pseudoindole compound, the lactose, the potato starch and the polyvinylpyrolidone are intimately admixed with each other, and the mixture is moistened with water. The moist mass is then forced through a 1.5 mm.-mesh screen, and the resulting granulate is dried at 45° C. The dry granulate is again passed through the screen, admixed with the glycolate and with the magnesium stearate, and the mixture is pressed into 220 mgm.-tablets. Each tablet contains 25 mgm. of the active ingredient.

EXAMPLE 25
Hypodermic solution

The solution is compounded from the following ingredients:

|  |  |
|---|---|
| 3-(β-dimethylamino-ethyl)-2-methyl-3-phenyl-pseudoindole hydrochloride _____parts__ | 25.0 |
| 1,2-propyleneglycol _____parts by vol__ | 1000.0 |
| Double-distilled water q.s. ad _____do____ | 2000.0 |

*Compounding procedure.*—The propyleneglycol and a major portion of the required amount of distilled water are admixed with each other, the mixture is heated to 60° C., and the pseudoindole compound is dissolved therein. The resulting solution is cooled to room temperature, and the remainder of the distilled water is added. 2 cc.-portions of the finished solution are filled into ampules, and the filled ampules are sterilized for twenty minutes at 120° C. and then sealed. Each ampule contains 25 mgm. of the active ingredient.

Although the above dosage unit compositions illustrate only one of the compounds according to the present invention as an active ingredient, it will be obvious and should be understood that any of the other compounds embraced by Formula I or a non-toxic, pharmacologically acceptable acid addition salt thereof may be substituted for the particular active ingredient in Examples 22 to 25. Moreover, the amount of active ingredient may be varied within the dosage unit limits set forth, and the amounts and nature of the inert carrier compounds may be varied to meet particular requirements.

We claim:
1. A compound of the formula

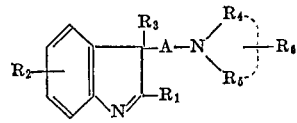

wherein
$R_1$ is methyl or phenyl,
$R_2$ is hydrogen, chlorine, methyl or methoxy,
$R_3$ is methyl, phenyl, tolyl, chlorophenyl, methoxyphenyl or dimethoxyphenyl,
$R_4$ is alkyl of 1 to 4 carbon atoms or alkenyl of 3 to 4 carbon atoms,
$R_5$ is alkyl of 1 to 6 carbon atoms, alkenyl of 3 to 5 carbon atoms, benzyl, phenylethyl or cyclopropylmethyl,
$R_4$ and $R_5$, together with each other and the nitrogen atom to which they are attached, are piperidino, pyrrolidino, morpholino, tetrahydropyridino or piperazino,
$R_6$ is hydrogen, methyl, ethyl, phenyl, tolyl or methoxyphenyl and
A is ethylene or propylene, or a non-toxic, pharmacologically acceptable acid addition salt thereof.

2. A compound according to claim 1, wherein $R_1$, $R_4$ and $R_5$ are methyl, $R_2$ is hydrogen, $R_3$ is phenyl and A is ethylene.

3. A compound according to claim 1, wherein $R_1$, $R_4$ and $R_5$ are methyl, $R_2$ is hydrogen, $R_3$ is phenyl, and A is 1,2-propylene.

4. A compound according to claim 1, wherein $R_1$, $R_4$ and $R_5$ are methyl, $R_2$ is hydrogen, $R_3$ is p-tolyl, and A is ethylene.

5. A compound according to claim 1, wherein $R_1$, $R_4$ and $R_5$ are methyl, $R_2$ is hydrogen, $R_3$ is m-methoxyphenyl, and A is ethylene.

6. A compound according to claim 1, wherein $R_1$ is methyl, $R_2$ is hydrogen, $R_3$ is phenyl, $R_4$ and $R_5$ together with each other and the nitrogen atom to which they are attached are piperidino, $R_6$ is hydrogen and A is ethylene.

References Cited
UNITED STATES PATENTS

| 1,915,334 | 6/1933 | Salzberg et al. | 260—243 |
| 2,075,359 | 3/1937 | Salzberg et al. | 167—22 |

ALEX MAZEL, Primary Examiner

J. TOVAR, Assistant Examiner

U.S. Cl. X.R.

260—247.1, 247.2, 247.5, 247.7, 254, 293.4, 294, 294.7, 296, 295, 294.8, 268, 566, 584, 570.5, 326.15

UNITED STATES PATENT OFFICE
CERTIFICATE OF CORRECTION

Patent No. 3,475,437                         October 28, 196

Claus Adolf Landgraf et al.

It is certified that error appears in the above identified patent and that said Letters Patent are hereby corrected as shown below:

Column 3, line 50, after "B.P.142-143° C" insert -- at 0.12 mm. Hg. --. Column 11, Formula in Example 14 should appear as shown below:

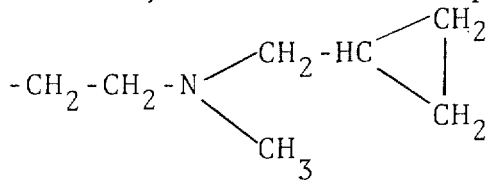

Column 12, lines 3 to 11, the formula should appear as shown belo

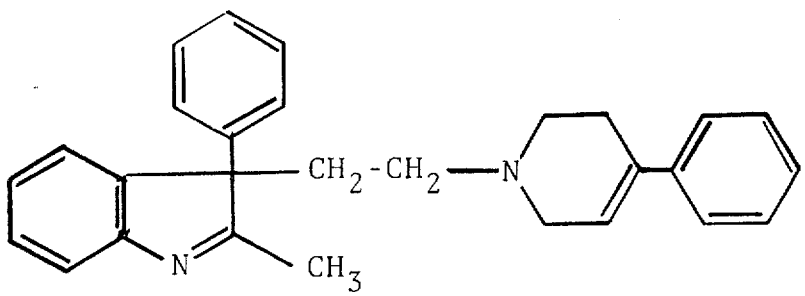

lines 24 to 31, the formula should appear as shown below:

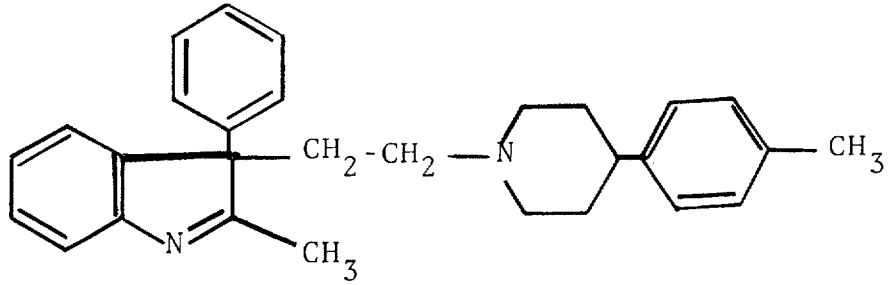

Signed and and sealed this 19th day of May 1970.

(SEAL)
Attest:

EDWARD M. FLETCHER, JR.                  WILLIAM E. SCHUYLER, J
Attesting Officer                              Commissioner of Patent